(12) United States Patent
Luppi

(10) Patent No.: US 11,752,600 B2
(45) Date of Patent: Sep. 12, 2023

(54) SCREWDRIVER FOR THREADED PLUG AND TIGHTENING DEVICE

(71) Applicant: POLYKAP S.R.L., Falciano (SM)

(72) Inventor: Davide Luppi, Borgo Maggiore (SM)

(73) Assignee: POLYKAP S.R.L., Falciano (SM)

( * ) Notice: Subject to any disclaimer, the term of this patent is extended or adjusted under 35 U.S.C. 154(b) by 185 days.

(21) Appl. No.: 17/207,191

(22) Filed: Mar. 19, 2021

(65) Prior Publication Data

US 2021/0299826 A1 Sep. 30, 2021

(30) Foreign Application Priority Data

Mar. 27, 2020 (IT) .................. 102020000006460

(51) Int. Cl.
*B25B 13/50* (2006.01)
*B25B 15/00* (2006.01)

(52) U.S. Cl.
CPC ........ *B25B 13/5008* (2013.01); *B25B 15/008* (2013.01)

(58) Field of Classification Search
CPC . B25B 13/5091; B25B 13/5008; B25B 13/06; B25B 13/065; B25B 27/0057; B25B 15/008
See application file for complete search history.

(56) References Cited

U.S. PATENT DOCUMENTS

| | | | | |
|---|---|---|---|---|
| 1,590,200 A | * | 6/1926 | McGuckin | B25B 27/0057 74/543 |
| 5,361,657 A | * | 11/1994 | Terry | B25B 27/0057 81/186 |
| 5,974,916 A | * | 11/1999 | Lassiter | B25B 27/0057 81/60 |
| 6,017,177 A | | 1/2000 | Lanham | |
| 6,922,887 B1 | * | 8/2005 | Keswani | H01R 43/033 29/757 |
| 6,988,432 B2 | | 1/2006 | Brooks | |
| 10,751,858 B1 | * | 8/2020 | Gershkovich | B25B 23/108 |
| 2014/0251091 A1 | | 9/2014 | Hui | |
| 2019/0176310 A1 | | 6/2019 | McKenzie et al. | |

FOREIGN PATENT DOCUMENTS

| | | |
|---|---|---|
| EP | 1055828 A2 | 11/2000 |
| EP | 3375570 A1 | 9/2018 |
| TW | 200621436 A | 7/2006 |

OTHER PUBLICATIONS

Italian Search Report dated Nov. 19, 2020 from counterpart Italian Patent Application No. 202000006460.
European Search Report dated Jul. 22, 2021 from counterpart European Patent Application No. 2102161.

* cited by examiner

*Primary Examiner* — David B. Thomas
(74) *Attorney, Agent, or Firm* — SHUTTLEWORTH & INGERSOLL, PLC; Timothy Klima

(57) ABSTRACT

A screwdriver device for a threaded plug includes a structure which extends along an axis and includes a head and a shank connected to a first end of the head, wherein the head has a second end which opens onto a cavity suitable for containing a head of a plug, wherein along the axis the cavity includes at least a first portion having a lateral surface which has a first profile and at least a second portion having a lateral surface which has a second profile which is not coincident with the first profile.

11 Claims, 4 Drawing Sheets

SCREWDRIVER FOR THREADED PLUG AND TIGHTENING DEVICE

This application claims priority to Italian Patent Application IT 10 2020000006460 filed Mar. 27, 2020, the entirety of which is incorporated by reference herein.

BACKGROUND OF THE INVENTION

This invention relates to a screwdriver device for a threaded plug, in particular for use in industry. This invention also relates to a tightening device.

For general use in industry there are prior art threaded plugs, usually made of plastic material, suitable for being inserted with forced screwing and tightening in a hole of a generic recipient component. Such plugs are used for the most diverse purposes, including, for example, that of closing holes, of protecting them from any damage, of covering them for functional or aesthetic reasons, of sealing them, of marking them, of making them hermetic, etc.

A prior art type of plugs comprises a monolithic structure, which extends along a longitudinal axis, in which three fundamental parts are essentially identifiable: a body, a flange and a head, parts which are placed one after another longitudinally to the axis.

The body of the plug is substantially cylindrical, is hollow inside, and is equipped with a profile wall in which an outer thread is made which is intended to couple with a suitable thread in contrast made inside the recipient hole for the plug.

The flange is essentially ring-shaped, and is interposed between the body and the head, jutting out relative to them and projecting transversally to the axis of the plug. During use of the plug the flange is intended to abut a part of the surface of the component surrounding the hole, applying to it a pushing action as a consequence of the screwing, the pushing action being stronger the higher the tightening torque used to forcibly screw the plug into the hole is.

The head takes the form of a tubular solid with prismatic profile, which extends for a short axial length, projecting from the flange on the opposite side to the body. The tubular solid is provided with a spacious inner cavity which, laterally, is surrounded by a thick wall, having the shape of a closed ring and having an even and constant thickness. The inner cavity is also equipped with a closed end, formed by the flange itself.

In the prior art plugs the head is provided with various types of coupling surfaces on which to engage a maneuvering tool for screwing or unscrewing the plug. First coupling surfaces are identified on the faces of the outer surface of the ring-shaped wall of the tubular solid; second coupling surfaces are in contrast on prominent projections contained inside the cavity.

More specifically, the outer first surfaces are substantially orthogonal to the lying plane of the flange and are shaped and sized in such a way that they can couple with a maneuvering tool which is for example an open-end wrench or a socket wrench, standardized, of standard production and normally used for tightening steel bolts. The maneuvering tools indicated above always operate by surrounding from the outside the outer surface of the tubular body of the head.

The second coupling surfaces, in contrast on the parallel projections inside the cavity, in contrast in combination with each other delimit an interposed seat or crack in which a further type of maneuvering tool can engage, again of standardized type for generic uses, in that case being a screwdriver which may be engaged in the seat to apply the stress necessary to screw/unscrew the plug.

As already indicated, the plug is normally made of plastic material. In contrast, the maneuvering tools of the standard type are made of high strength steel and are sized in such a way that they are capable of applying tightening torques of an intensity suitable for fully tightening steel bolts. During use of these tools for fitting/removing plastic plugs it is necessary to carefully modulate the intensity of the tightening torque in such a way as to ensure that the correct compromise is always achieved between tightening of the plug which is appropriate for the specific functions required of it, and tightening which is not excessive and is below a limit which could cause permanent damage to the head of the plug.

Damage to the plug could even be caused by the circumferential play with which the maneuvering tool engages with the first and/or with the second coupling surfaces previously defined.

In order to overcome that disadvantage, there are prior art screwdriver devices used for tightening a predetermined plug. Such screwdriver devices are provided with a head suitable for operating with direct coupling, without play, with respective active surfaces of the plug which are inside the ring-shaped wall of the tubular solid which forms the head of the plug, and oblique relative to the axis of the plug.

The head of such screwdriver devices has a cap-shaped structure with shaped perimetric edges provided with notches. The notches are shaped to match corresponding projections inside a cavity made in the head of the plug.

Therefore, that screwdriver device is suitable for tightening only a predetermined plug which has a particular head configuration and cannot be used for commonly used plugs.

Moreover, industrial components which involve the use of plugs may have different threads. Generally for each thread there is a plug suitable for being tightened with a specific tool. The tightening may generally occur in three different ways: by means of a hexagonal wrench, by means of a box end wrench or by means of a screwdriver. In an assembly line, when the component has plugs with different threads, the operator must therefore continuously change the tool depending on the plug to be screwed or unscrewed. This involves slowing of the assembly line.

Also, a precise tightening torque corresponds to each thread. That tightening torque is usually indicated when a plug or the screwdriver device for tightening the plug corresponding to the specific thread is supplied. Therefore, for each thread the operator must not only select the correct screwdriver device but also each time must set the corresponding tightening torque.

Moreover, prior art screwdriver devices have a shank which extends starting from the head and engages with the maneuvering tool. The shank may be solid and suitable for being inserted inside a hollow maneuvering tool or it may have a cavity into which the maneuvering tool may be inserted. Therefore, on each occasion the screwdriver device must be selected depending on the shape and size of the maneuvering tool which is inserted in the cavity of the shank.

SUMMARY OF THE INVENTION

The aim of this invention is to overcome those disadvantages by allowing the operator to screw or unscrew plugs which have different threads using the same tool.

According to this invention, a screwdriver device is supplied having features as disclosed herein.

The presence of two portions positioned along the axis and having two profiles which are not coincident allows use of the screwdriver device for tightening plugs with heads having a different shape and/or dimensions. Indeed, the first portion of the cavity of the head of the screwdriver device may act on the head of a plug having a shape or size which corresponds to the first profile, whilst the second portion of the cavity may act on the head of plug having a shape or size which corresponds to the second profile. Therefore, the operator will be able to use a single screwdriver device for tightening different plugs using the first or the second portion of the cavity of the head of the screwdriver device.

According to another aspect of this invention, a screwdriver device is supplied having features as disclosed herein.

The shank with a cavity having two portions positioned along the axis and having two profiles which are not coincident allows use of the screwdriver device with tools having a different shape and/or dimensions. Indeed, the first portion of the cavity of the shank of the screwdriver device allows the insertion of a tool having a shape or size which corresponds to the first profile, whilst the second portion of the cavity of the screwdriver device allows the insertion of a tool having a shape or size which corresponds to the second profile. Therefore, the operator will be able to use a single screwdriver device for tightening with different tools using the first or the second portion of the cavity of the shank of the screwdriver device.

According to this invention, a tightening device is also supplied having features as disclosed herein.

The combination between a plug having a head which has two portions with profiles which are not coincident and a screwdriver device having a cavity with two portions having profiles corresponding to those of the head of the plug allows optimum tightening.

Moreover, it is possible to use the same tightening torque for plugs having different threads, suitable for all threaded diameter sizes, by calculating an average of the resistances to the tightening torque for all of the threads indicated in UNI-ISO tables.

BRIEF DESCRIPTION OF THE DRAWINGS

Further advantages and features of this invention will be more apparent in the detailed description which follows, with reference to the accompanying drawings, which show an example, non-limiting embodiment, in which.

DESCRIPTION OF THE PREFERRED EMBODIMENTS

Figure 1:
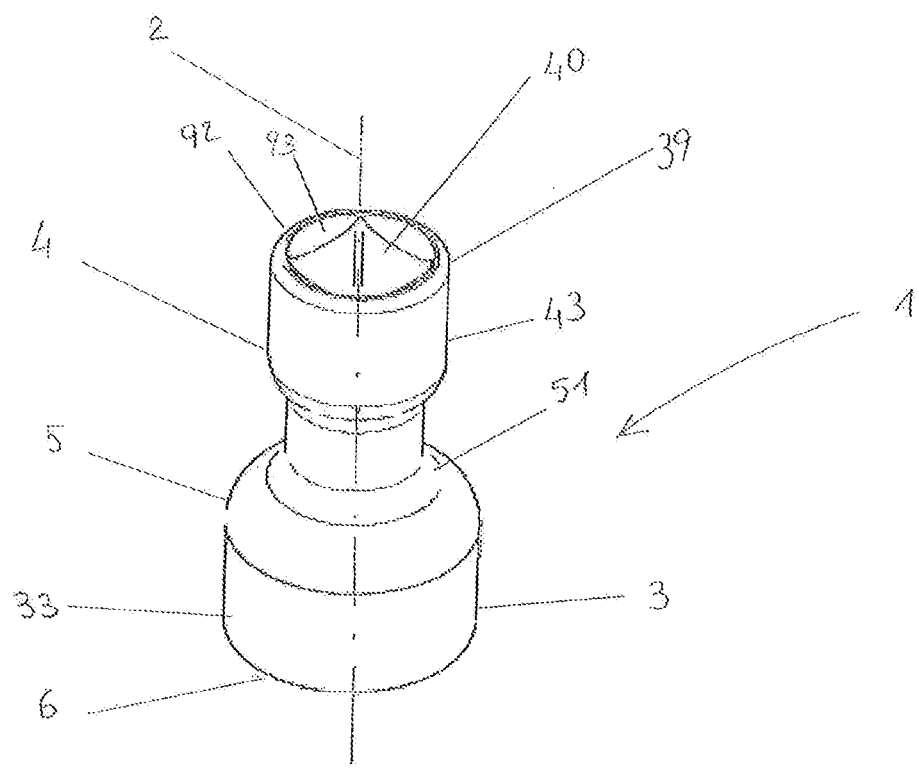
FIG. 1 is a first perspective view which illustrates a preferred embodiment of the screwdriver device as a whole.

In FIG. 1 the numeral 1 denotes in its entirety a screwdriver device for a threaded plug.

The screwdriver device 1 comprises a structure which extends along a longitudinal axis 2. The structure comprises a head 3 and a shank 4, connected to a first end 5 of the head 3. The head 3 has a second end 6 which opens onto a cavity 7 suitable for containing the head of a plug.

According to the invention, along the axis 2 the cavity 7 comprises at least a first portion 8 having the lateral surface 9 which has a first profile 10 and at least a second portion 11 having the lateral surface 12 which has a second profile 13 which is not coincident with the first profile 10.

Advantageously, the first portion 8 and the second portion 11 are adjacent along the direction of the axis 2.

The first portion 8 is positioned nearer the open end 6 of the cavity 7. In particular, as illustrated in FIGS. 1 to 3, the first portion 8 extends starting from the open second end 6 of the head 3 in a direction substantially parallel to the axis of the screwdriver device 1.

The lateral surface 12 of the second portion 11 is positioned nearer the axis 2 of the screwdriver device 1 than the lateral surface 9 of the first portion 8.

The two portions 8, 11 may have the lateral surface 9, 12 having the same profile, but different dimensions, therefore allowing the tightening of plugs with the head having the same shape, but different dimensions.

Figure 2:
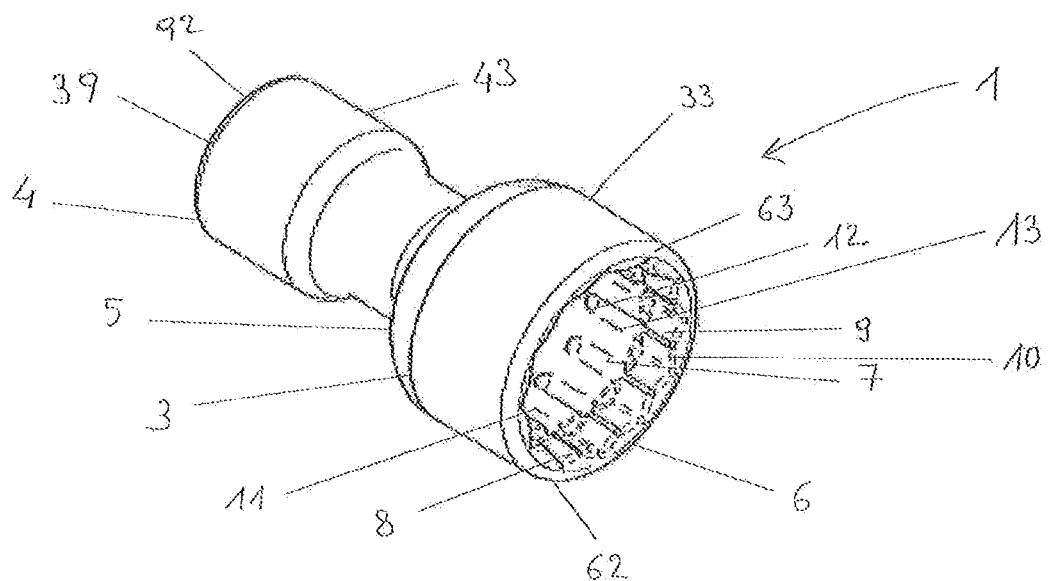
FIG. 2 is a second perspective view which illustrates the inside of the head of the screwdriver device of FIG. 1.
Figure 3:
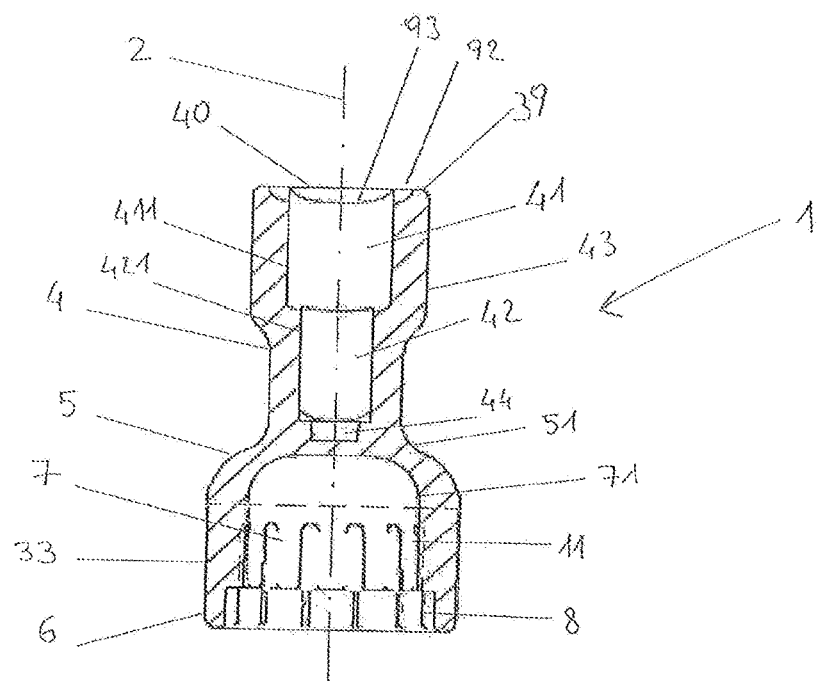
FIG. 3 is a longitudinal section of the screwdriver device of FIG. 1.
Figure 4:
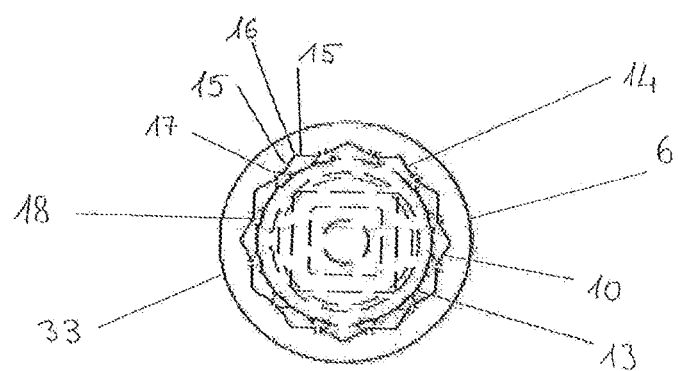
FIG. 4 is a bottom plan view of the screwdriver device of FIG. 1.

In the preferred embodiment illustrated in FIGS. 2 to 4, the lateral surface 9 of the first portion 8 has a profile 10 different from the profile 13 of the lateral surface 12 of the second portion 11.

In particular, the first profile 10 is substantially polygonal and the second profile 13 is substantially circular.

As illustrated in FIGS. 2 and 4, the first profile 10 has substantially the shape of a concave polygon, preferably formed by a closed broken line 14 comprising pairs of segments 15 which are joined at a first end 16, wherein the pairs are joined at a second end 17 and are positioned according to a substantially circular configuration. The first ends 16 of the segments 15 form the outermost vertices of the polygon; the second ends 17 form the innermost vertices of the polygon. Preferably the angles between the two segments 15 are the same for each pair in such a way as to form a regular polygon. In particular, the concave polygon is obtained by superposing two rotated hexagons.

In this way it is possible to join the screwdriver device 1 to a plug with hexagonal head always and correctly, irrespective of the angular orientation about the axis of the plug at the moment of assembly with the plug.

Preferably the innermost vertices 17 of the polygon are rounded in such a way as to facilitate insertion of the head of the plug.

Advantageously, the lateral surface 12 of the second portion 11 has a plurality of recesses 18 which extend in the direction of the axis 2 and are distributed, in particular evenly, along the circumference of the second profile 13.

In this way it is possible to join the screwdriver device 1 to a plug with a substantially circular head, of the type having a plurality of ribs distributed along the circumference of the outer lateral surface. The tightening of this type of plug usually requires the use of a box end wrench.

Preferably, the substantially circular second profile 13 is inscribed in the polygon of the first profile 10.

In particular, as illustrated in FIG. 4, the recesses 18 of the circular second profile 13 coincide with the innermost vertices 17 of the concave polygon.

In this way it is possible to use the screwdriver device 1 both as a box end wrench and as a hexagonal wrench. Therefore the screwdriver device is advantageously suitable for tightening plugs having a head with different shapes. In particular, the screwdriver device is suitable both for tightening plugs having a head with a hexagonal shape and plugs having a head with a substantially circular shape.

For example the first portion 8 of the cavity 7 of the head 3 of the screwdriver device 1 may be used both as a 17 mm hexagonal wrench for tightening a plug with hexagonal head or as a 17 mm box end wrench (or 11/16" box end wrench) for tightening a plug with substantially circular head. The second portion 11 of the cavity 7 of the head 3 of the screwdriver device 1 may be used as a 16 mm box end wrench or 5/8" box end wrench for tightening a plug with substantially circular head which has smaller dimensions.

Advantageously, the shank 4 is fixed to the head 3. Preferably, the outer surface 33 of the head 3 is substantially cylindrical. In particular, at the first end 5 opposite to the open second end 6, the outer surface 33 has a curvature 51 for connection to the shank 4. Advantageously, the cavity 7 extends towards the first end 5 of the head 3 opposite to the open second end 6. That extension 71 facilitates the discharge of air at the moment of engagement of the tool on the plug. Moreover, the extension 71 of the cavity 7 towards the shank 4 allows a thickness of the wall which surrounds the cavity 7 to be kept substantially constant in order to avoid shrinkage of the material during manufacturing.

The cavity 7 is closed at the first end 5 of the head 3.

Preferably, the edge 62 of the open end 6 of the cavity 7 has a curvature 63 towards the inside in order to facilitate the engagement of the tool on the plug.

Advantageously, the screwdriver device 1 is made of plastic material, and gives the shank 4 a considerable torsional elasticity which allows, when the shank 4 deforms under load, automatic dissipation of any excess rotation torque applied to the plug.

According to another aspect of this invention, the shank 4 of the screwdriver device 1 has an end 39 opposite to the head 3 which opens onto a cavity 40 suitable for allowing the insertion of a tool, wherein along the axis 2 of the screwdriver device 1 the cavity 40 comprises at least a first portion 41 having a lateral surface 411 which has a first profile 412 and at least a second portion 42 having a lateral surface 421 which has a second profile 422 which is not coincident with the first profile 412.

Advantageously, the first portion 41 and the second portion 42 are adjacent along the direction of the axis 2.

The first portion 41 is positioned nearer the open end 40 of the cavity 39. In particular, as illustrated in FIGS. 1 to 3, the first portion 41 extends starting from the open end 39 of the shank 4 towards the head 3 in a direction substantially parallel to the axis of the screwdriver device 1.

Advantageously, the lateral surface 421 of the second portion 422 of the cavity 40 of the shank 4 is positioned nearer the axis 2 of the screwdriver device 1 than the lateral surface 411 of the first portion 41 of the cavity 40 of the shank 4.

In one embodiment the two portions 41, 42 have the lateral surface 411, 421 having the same profile, but different dimensions, therefore allowing the use of tools having different dimensions.

Figure 5:
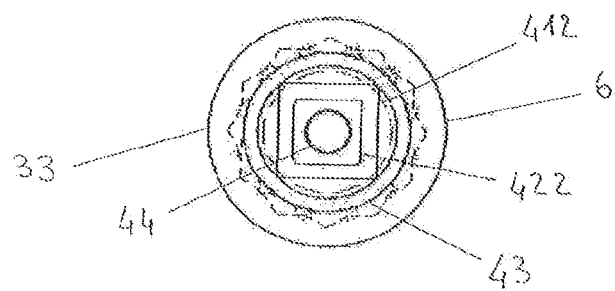
FIG. 5 is a top plan view of the screwdriver device of FIG. 1.

In the embodiment illustrated in FIG. 5, the first profile 412 of the lateral surface 411 of the first portion 41 and the second profile 422 of the lateral surface 421 of the second portion 42 of the cavity 40 of the shank 4 is substantially square.

In an alternative embodiment not illustrated, the lateral surface 411 of the first portion 41 has a profile different from that of the lateral surface 421 of the second portion 41, allowing the use of tools having a different shape.

In one embodiment not illustrated, the screwdriver device has a head with a cavity 7 which along the axis 2 comprises at least a first portion 8 having the lateral surface 9 which has a first profile 10 and at least a second portion 11 having the lateral surface 12 which has a second profile 13 which is not coincident with the first profile 10, and a shank 4 with a cavity having a single portion or a solid shank. The tools may be inserted inside the cavity 40 of the shank 4 of the screwdriver device 1 or on the outer surface 43 of the shank 4 itself.

In a further embodiment not illustrated, the screwdriver device 1 has a head 3 comprising a single portion and a shank 4 with a cavity 40 suitable for allowing the insertion of a tool, wherein along the axis 2 of the screwdriver device 1 the cavity 40 comprises at least a first portion 41 having a lateral surface 411 which has a first profile 412 and at least a second portion 42 having a lateral surface 421 which has a second profile 422 which is not coincident with the first profile 412.

The screwdriver device 1 is therefore suitable for being used with tools having a different shape and/or dimensions. The tools may be inserted inside the cavity 40 of the shank 4 of the screwdriver device 1.

Preferably, the outer surface 43 of the shank 4 is substantially cylindrical. In the embodiment illustrated in FIGS. 1 to 3, the shank 4 has an outer diameter which is larger at the first portion 41 of the cavity 40 and an outer diameter which is smaller at the second portion 42 of the cavity 40. This allows substantially even thicknesses of the solid wall to be maintained.

Advantageously, the cavity 40 of the shank 4 has an extension 44 towards the first end 5 of the head 3. That extension 44 facilitates the discharge of air at the moment of engagement of the tool inside the shank.

The cavity 40 is closed at the first end 5 of the head 3 of the screwdriver device.

Preferably, the edge 92 of the open end 39 of the cavity 40 has a curvature 93 towards the inside in order to facilitate the engagement of the tool.

The screwdriver device 1 may also be used for a special plug, illustrated in FIGS. 6 to 10.

The plug 19, preferably made of plastic material, comprises a structure which extends along a longitudinal axis 20. The structure comprises a body 21, a flange 22 and a head 23, which are positioned in an orderly way continuing on from one another along the axis 20, with the flange 22 interposed between the body 21 and the head 23.

The body 21 is externally equipped with a thread 24, which shall be considered suitable for a matching inner thread of the hole of the recipient component for the plug 19. Preferably the body 21 is hollow inside.

Figure 6:
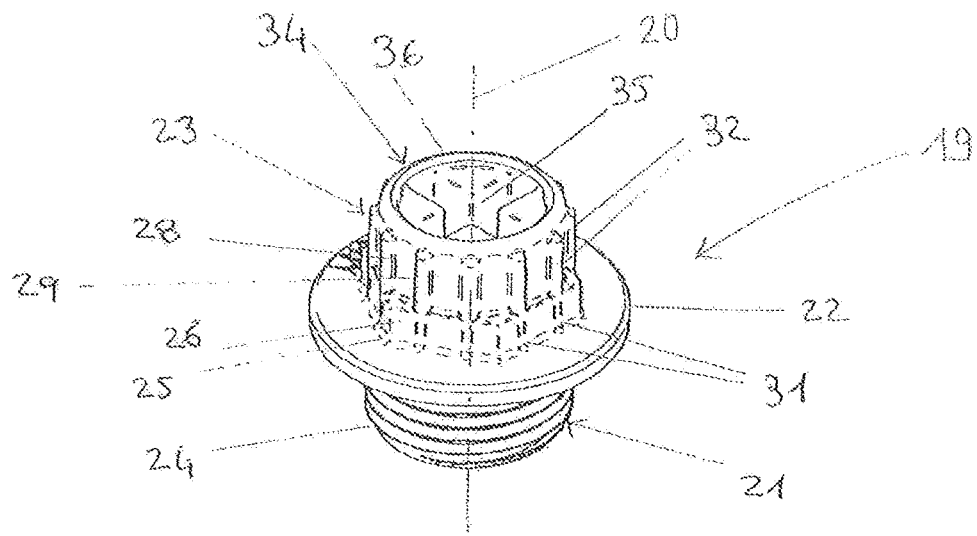
FIG. 6 is a perspective view which illustrates a preferred embodiment of a threaded plug which is part of the tightening device.
Figure 9:
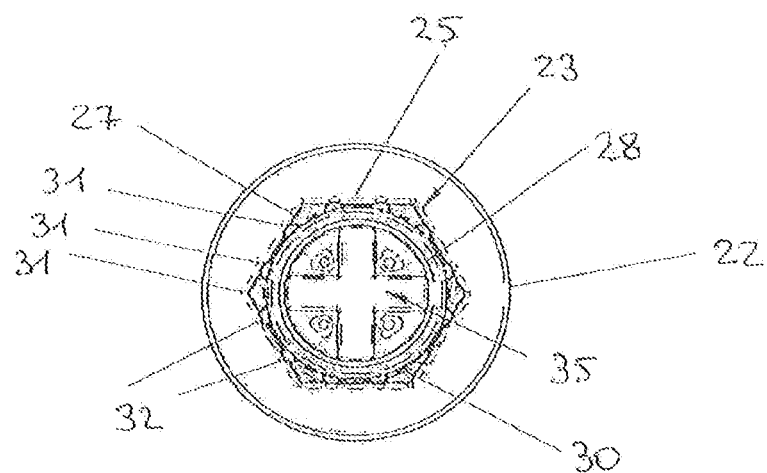
FIG. 9 is a top plan view of the plug of FIG. 6.
Figure 10:
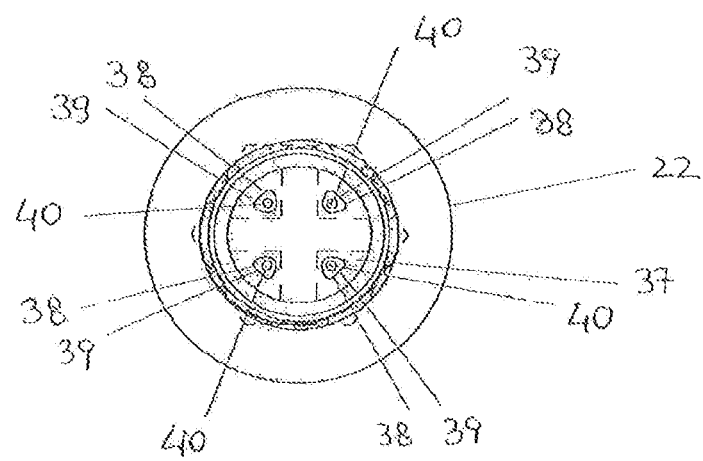
FIG. 10 is a bottom plan view of the plug of FIG. 6.

Along the axis 20 the head 23 of the plug 19 comprises at least a first portion 25 having an outer lateral surface 26 which has a first profile 27 and at least a second portion 28 having an outer lateral surface 29 which has a second profile 30 which is not coincident with the first profile 27 (FIGS. 6 and 9).

In the embodiment illustrated, the first portion 25 and the second portion 28 are adjacent along the direction of the axis 20.

Figure 7:
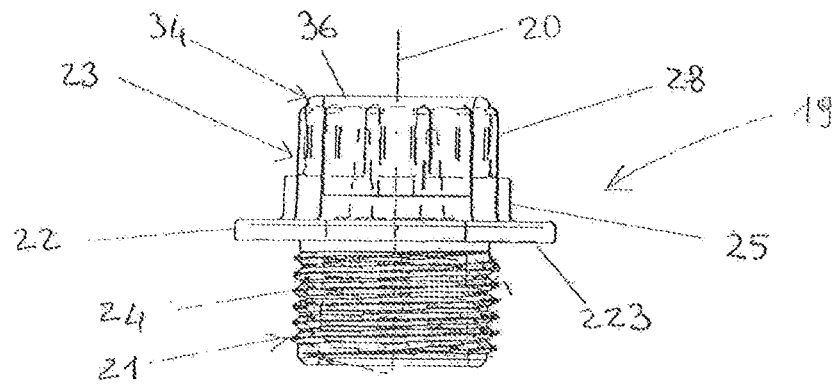
FIG. 7 is a front view of the plug of FIG. 6.
Figure 8:
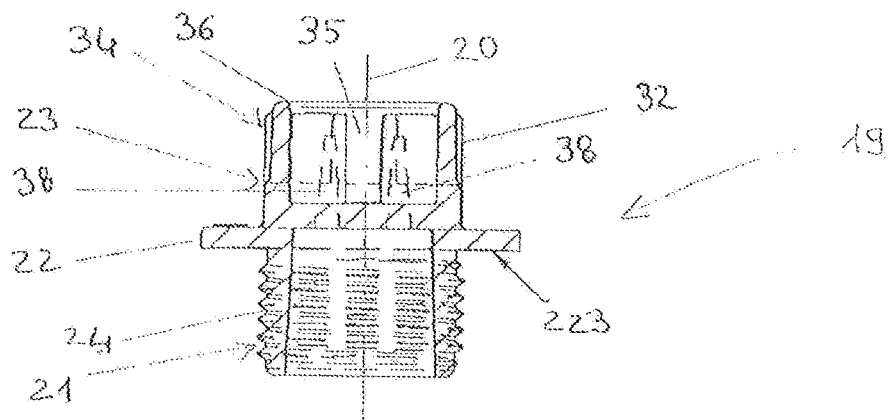
FIG. 8 is a longitudinal section of the plug of FIG. 6.

In particular, as illustrated in FIGS. 6 to 8, the first portion 25 extends starting from the flange 22 in a direction substantially parallel to the axis 20 of the plug 19.

In this way the flange 22 forms a supporting surface during tightening by means of use of a tool suitable for the first profile 27 of the outer lateral surface 26 of the first portion 25.

According to one advantageous embodiment, the flange 22 has a concavity or curvature 223 towards the threaded body 21 of the plug 19 to increase adherence during tightening.

In one preferred embodiment, the outer lateral surface 26, 29 of the first portion 25 and/or of the second portion 28 of the head 23 is provided with at least one rib 31, 32 which extends in the direction of the axis 20. Preferably the outer lateral surface 26, 29 has a plurality of ribs 31, 32 which are distributed along the perimeter or the circumference of the surface 26, 29 itself. In the case of a circular profile the ribs 32 are in particular evenly distributed along the circumference and allow tightening by means of a box end wrench. In the case of a hexagonal profile, the ribs 31 are in particular distributed on the sides of the hexagon to assist the tightening.

The two portions 25, 28 may have the lateral surface having the same profile, but different dimensions, therefore allowing the use of two tools of the same type but with a head having different dimensions.

Advantageously the outer lateral surface 29 of the second portion 28 is positioned nearer the axis 20 of the plug 19 than the outer lateral surface 26 of the first portion 25 near the flange 22. This means that the plug 19 is easy to make and facilitates the use of a tool suitable for the second profile 30 of the outer lateral surface 29 of the second portion 28, since during use the tool stops against the first portion 25.

In the preferred embodiment illustrated in FIGS. 5 to 9, the outer lateral surface 26 of the first portion 25 has a profile 27 different from the profile 30 of the outer lateral surface 29 of the second portion 28.

In particular, the first profile 27 is substantially polygonal, in particular hexagonal, and the second profile 30 is substantially circular.

The outer lateral surface 29 of the second portion 28 has a plurality of ribs 32 evenly distributed along the circumference of the profile 30, in such a way that the plug 19 can be tightened using a box end wrench.

Preferably, the substantially circular second profile 30 is inscribed in the polygon of the first profile 27. In this way it is possible to use either a box end wrench or a hexagonal wrench to tighten the same plug.

In the embodiment illustrated, the outer lateral surface 26 of the first portion 25 has a plurality of ribs 31 distributed along the perimeter of the profile 27. In particular, the ribs 31 are the extension of the ribs 32 distributed along the circumference of the profile 30. This allows the plug 19 to be tightened even with a box end wrench of a size greater than that corresponding to the diameter of the second portion 28, for example a 17 mm box end wrench. Indeed the box end wrench engages on the first portion 25 with hexagonal profile 27, making contact on the flange 22, and grips the ribs 31 during tightening.

Advantageously, the second portion 28 comprises the free end 34 of the head 23 of the plug 19 opposite to the flange 22. The second portion 28 has at least one cavity 35 into which the head of a tool may be inserted. In this way it is also possible to use a tool such as a screwdriver to perform the tightening.

In one preferred embodiment, the cavity 35 made in the second portion 28 is configured substantially in the shape of a cross. In this way for tightening it is possible to use either a flat blade screwdriver or a Phillips cross head screwdriver.

In the embodiment illustrated in FIGS. 6 to 10, the cavity 35 extends inside the second portion 28 as far as the first portion 25.

According to one preferred embodiment, at the opposite end 34 to the flange 22 the second portion 28 has a raised edge 36 which extends along the perimeter or the circumference of the lateral surface.

The plug 19 is advantageously made in one piece, preferably of plastic material.

The body 21 provided with an outer thread 24 is hollow and has an end 37 formed by the flange 22. As illustrated in particular in FIGS. 6 and 9, the end 37 has at least one hole 38 which passes through the flange 22 substantially in the direction of the axis 20 extending inside the first portion 25. Preferably the hole 38 extends partly in the solid part of the second portion 28 of the head 23. Advantageously, as illustrated in particular in FIGS. 8 and 9, the end 37 has four holes 38 which are positioned symmetrically relative to the axis 20 of the plug 19.

The hole 38 has a substantially triangular section 39 at the end 37 of the threaded body 21 and extends in an inclined way relative to the axis 20 of the plug 19, ending with a substantially circular section 40 having a size smaller than the triangular section 39. The presence of "gaps" in the head 23 of the plug 19 allows easier removal of the part from the mold.

A plug of this type may be defined "universal", since it can be screwed and unscrewed without having to change the tool.

Moreover, corresponding to that plug there is a standardized tightening torque, which may be defined "universal average" tightening torque, suitable for all threaded diameter sizes.

Therefore, according to this invention a "universal" screwdriver device is supplied, which may be used for plugs with a head having a different size and/or shape, for example plugs with a head which is hexagonal or circular with ribs or for "universal" plugs, whose head has at least two portions with profiles which are not coincident. The screwdriver device may be used with tools having a different size and/or shape.

According to this invention a tightening device is also supplied comprising the screwdriver device and at least one "universal" plug.

In the tightening device, the first portion 8 of the cavity 7 of the screwdriver device 1 is suitable for engaging with the first portion 25 of the head 23 of the plug 19 having the first profile 27 and the second portion 11 of the cavity 7 of the screwdriver device 1 is suitable for engaging with the second portion 28 of the head 23 of the plug 19 having the second profile 30. In this way the tightening occurs in a more effective way, since two portions of the head of the plug are engaged.

Advantageously, the second portion 28 of the head 23 of the plug 19 is shaped to match the corresponding second portion 11 of the cavity 7 of the screwdriver device 1. This allows elimination of the play between the screwdriver device and plug, improving tightening.

In the embodiment illustrated in the figures, the first profile 10 of the lateral surface 9 of the first portion 8 of the cavity 7 of the screwdriver device 1 has substantially the shape of a concave regular polygon and is suitable for engaging with a corresponding first profile 27 which is substantially polygonal, in particular hexagonal, of the outer lateral surface 26 of the first portion 25 of the head 23 of the plug 19, and the second profile 13 of the lateral surface 12 of the second portion 11 of the cavity 7 of the screwdriver device 1 is substantially circular and is suitable for engaging with a corresponding substantially circular second profile 30 of the outer lateral surface 29 of the second portion 28 of the head 23 of the plug 19.

In particular, the lateral surface 12 of the second portion 11 of the cavity 7 of the screwdriver device 1 has a plurality of recesses 18 which extend in the direction of the axis 2 of the screwdriver device 1 and are distributed along the circumference of the second profile 13, and are suitable for engaging with corresponding ribs 32 which extend in the direction of the axis 20 of the plug 19 and are distributed along the circumference of the second profile 30 of the outer lateral surface 29 of the second portion 28 of the head 23 of the plug 19.

What is claimed is:

1. A screwdriver device for a threaded plug comprising:
   a structure which extends along an axis and includes a head and a shank connected to a first end of the head, wherein the head has a second end which opens onto a cavity suitable for containing a head of a plug;
   wherein along the axis, the cavity comprises at least a first portion having a lateral surface which has a first profile and at least a second portion having a lateral surface which has a second profile which is not coincident with the first profile;
   wherein the first profile is substantially shaped as a concave regular polygon and the second profile is substantially circular, and each of the first profile and the second profile is configured to rotationally drive a corresponding shape independently of the other of the first profile and the second profile;
   wherein the lateral surface of the second portion includes a plurality of recesses which extend in a direction of the axis and are distributed along a circumference of the second profile.

2. The screwdriver device according to claim 1, wherein the second portion is adjacent to the first portion in the direction of the axis.

3. The screwdriver device according to claim 1, wherein the first portion extends starting from the open second end of the head in a direction substantially parallel to the axis.

4. The screwdriver device according to claim 1, wherein the shank has an end opposite to the head which opens onto a cavity suitable for allowing the insertion of a tool, wherein along the axis, the cavity of the shank comprises at least a first portion having a lateral surface which has a first profile and at least a second portion having a lateral surface which has a second profile which is not coincident with the first profile.

5. The screwdriver device according to claim 4, wherein at least one chosen from the first profile of the lateral surface of the first portion and the second profile of the lateral surface of the second portion of the cavity of the shank, is substantially square.

6. The screwdriver device according to claim 1, wherein the lateral surface of the second portion of the cavity of the shank is positioned nearer the axis of the screwdriver device than the lateral surface of the first portion of the cavity of the shank.

7. A tightening device comprising:
   the screwdriver device according to claim 1;
   at least one threaded plug comprising a structure which extends along a further axis and includes a head, a body including an outer thread, and a tightening flange interposed between the head and the body;
   wherein along the further axis, the head of the plug comprises at least a first portion having an outer lateral surface which has a first profile and at least a second portion having an outer lateral surface which has a second profile which is not coincident with the first profile,
   wherein the first portion of the cavity of the head of the screwdriver device is suitable for engaging the first potion of the head of the plug having the first profile, and the second portion of the cavity of the head of the screwdriver device is suitable for engaging the second portion of the head of the plug having the second profile.

8. The tightening device according to claim 7, wherein the second portion of the head of the plug is shaped to match the second portion of the cavity of the screwdriver device.

9. The tightening device according to claim 7, wherein the first profile of the lateral surface of the first portion of the cavity of the screwdriver device is shaped substantially as a concave regular polygon and is suitable for engaging a corresponding first profile which is substantially polygonal, of the outer lateral surface of the first portion of the head of the plug, and the second profile of the lateral surface of the second portion of the cavity of the screwdriver device is substantially circular and is suitable for engaging a corresponding substantially circular second profile of the outer lateral surface of the second portion of the head of the plug.

10. The tightening device according to claim 9, wherein the lateral surface of the second portion of the cavity of the screwdriver device includes a plurality of recesses which extend in the direction of the axis of the screwdriver device and are distributed along the circumference of the second profile, wherein the recesses are suitable for engaging with corresponding ribs which extend in the direction of the further axis of the plug and are distributed along a circumference of the second profile of the outer lateral surface of the second portion of the head of the plug.

11. The tightening device according to claim 9, wherein the second profile of the outer lateral surface of the second portion of the head of the plug is inscribed in the substantially polygonal first profile of the outer lateral surface of the first portion of the head of the plug.

* * * * *